(12) United States Patent
Oh et al.

(10) Patent No.: US 8,390,775 B2
(45) Date of Patent: Mar. 5, 2013

(54) LIQUID CRYSTAL DISPLAY DEVICE WITH PROTECTION FILM AT CONNECTION OF TCP AND THERMINAL AND FABRICATION METHOD THEREOF

(75) Inventors: Jae-Young Oh, Uiwang-si (KR); Jong-Il Kim, Annyang-si (KR); Soo-Pool Kim, Seongnam-si (KR)

(73) Assignee: LG Display Co., Ltd., Seoul (KR)

( * ) Notice: Subject to any disclaimer, the term of this patent is extended or adjusted under 35 U.S.C. 154(b) by 664 days.

(21) Appl. No.: 11/452,386

(22) Filed: Jun. 14, 2006

(65) Prior Publication Data

US 2007/0002257 A1 Jan. 4, 2007

(30) Foreign Application Priority Data

Jun. 30, 2005 (KR) ................. 10-2005-0058140

(51) Int. Cl.
*G02F 1/1333* (2006.01)
*G02F 1/1339* (2006.01)
*G09G 3/36* (2006.01)

(52) U.S. Cl. ........ 349/150; 349/149; 349/151; 349/152; 349/153; 349/190; 345/104

(58) Field of Classification Search .................. 349/153, 349/155, 190, 149–152; 345/104
See application file for complete search history.

(56) References Cited

U.S. PATENT DOCUMENTS

| | | | | |
|---|---|---|---|---|
| 3,647,280 A | * | 3/1972 | Klein et al. | 349/142 |
| 4,130,408 A | | 12/1978 | Crossland et al. | |
| 4,139,273 A | * | 2/1979 | Crossland et al. | 349/35 |
| 4,336,551 A | * | 6/1982 | Fujita et al. | 257/668 |
| 5,233,452 A | | 8/1993 | Iguchi | |
| 5,706,064 A | * | 1/1998 | Fukunaga et al. | 349/43 |
| 5,790,220 A | * | 8/1998 | Sakamoto et al. | 349/110 |
| 5,818,562 A | | 10/1998 | Yoon | |
| 6,132,548 A | * | 10/2000 | Woods et al. | 156/275.5 |
| 6,376,400 B1 | | 4/2002 | Fujimine et al. | |
| 6,437,846 B1 | * | 8/2002 | Ono et al. | 349/149 |
| 6,495,262 B2 | * | 12/2002 | Igeta | 428/426 |
| 6,737,289 B2 | * | 5/2004 | Woo et al. | 438/30 |
| 2003/0214541 A1 | | 11/2003 | Jun et al. | |
| 2005/0041190 A1 | * | 2/2005 | Hong | 349/149 |

FOREIGN PATENT DOCUMENTS

| | | |
|---|---|---|
| CN | 1414643 | 4/2003 |
| CN | 1497345 | 5/2004 |
| DE | 27 38 305 | 3/1978 |
| DE | 42 09 135 | 10/1992 |
| JP | 52-134457 | 11/1977 |
| JP | 52-139453 | 11/1977 |
| JP | 52-150844 | 12/1977 |
| JP | 54-094060 | 7/1979 |
| JP | 54-150150 | 11/1979 |
| JP | 56-004119 | 1/1981 |
| JP | 56-014218 | 2/1981 |
| JP | 56-032124 | 4/1981 |
| JP | 56-114922 | 9/1981 |

(Continued)

*Primary Examiner* — Hoan C Nguyen
(74) *Attorney, Agent, or Firm* — McKenna Long & Aldridge, LLP

(57) ABSTRACT

A liquid crystal display device includes first and second substrates facing each other; a liquid crystal layer between the first and second substrates; and a seal pattern between the first and second substrates surrounding the liquid crystal layer, wherein the seal pattern is made of one of frit glass and glass paste.

3 Claims, 4 Drawing Sheets

FOREIGN PATENT DOCUMENTS

| | | | |
|---|---|---|---|
| JP | 57-177122 A | | 10/1982 |
| JP | 57177122 A | * | 10/1982 |
| JP | 57-188020 | | 11/1982 |
| JP | 2-157139 A | | 6/1990 |
| JP | 02157139 A | * | 6/1990 |
| JP | 4-8465 | | 1/1992 |
| JP | 4-026525 | | 1/1992 |
| JP | 08-064557 | | 3/1996 |
| JP | 2000-505414 | | 5/2000 |
| JP | 2001-151532 | | 6/2001 |
| JP | 2002-020138 | | 1/2002 |
| TW | 200502660 A | | 1/2005 |

* cited by examiner

LIQUID CRYSTAL DISPLAY DEVICE WITH PROTECTION FILM AT CONNECTION OF TCP AND THERMINAL AND FABRICATION METHOD THEREOF

This application claims the benefit of Korean Patent Application No. 10-2005-0058140, filed in Korea on Jun. 30, 2005, which is hereby incorporated by reference for all purposes as if fully set forth herein.

BACKGROUND OF THE INVENTION

1. Field of the Invention

The present application relates to a liquid crystal display device and, more particularly, to a liquid crystal display device and a fabrication method thereof.

2. Description of the Related Art

Display devices used in the past have typically been cathode-ray tubes (CRT). Presently, however, much effort has been made to study and develop various types of flat panel displays, such as liquid crystal display (LCD) devices, plasma display panels (PDP), field emission displays, and electroluminescence displays (ELD), as substitutes for CRTs. Of these flat panel displays, LCD devices have advantages, such as high resolution, light weight, thin profile, compact size, and low power supply requirements.

An LCD device typically includes two substrates that are spaced apart and face each other with a liquid crystal material interposed between the two substrates. The two substrates include electrodes that face each other such that a voltage applied between the electrodes induces an electric field across the liquid crystal material. Alignment of the liquid crystal molecules in the liquid crystal material changes in accordance with the intensity of the induced electric field, thereby changing the light transmissivity of the LCD device. Thus, the LCD device displays images by varying the intensity of the induced electric field.

FIG. 1 is a schematic plan view of an LCD device according to the related art, and FIG. 2 is a cross-sectional view of an LCD device of FIG. 1.

As shown in FIGS. 1 and 2, the related art LCD device 1 includes a first substrate 11, a second substrate 61 and a liquid crystal layer 90 between the two substrates 11 and 61.

On the first substrate 11, a plurality of gate lines 13 and a plurality of data lines 30 cross each other to define a plurality of pixel regions P. A plurality of thin film transistors Tr are disposed at crossing portions of the gate and data lines 13 and 30. A pixel electrode 50 is connected to the thin film transistor Tr, in each pixel region P. The thin film transistor Tr includes a gate electrode 15, a semiconductor layer 23 having an active layer 23a and an ohmic contact layer 23b, a source electrode 33 and a drain electrode 35. A gate insulating layer 20 is disposed on the gate electrode 15, and a passivation layer 40 has a drain contact hole 43 exposing the drain electrode 35.

On the second substrate 61, a black matrix 63, including a first black matrix 63a and a second black matrix 63b are disposed. The first black matrix 63a has a lattice shape surrounding each pixel region P to shield the gate and data lines 13 and 30 and the thin film transistor Tr. The second black matrix 63b is disposed at a peripheral region of the second substrate 61 and is connected to end portions of the first black matrix 63a.

A color filter pattern 66 including red (R), green (G) and blue (B) color filter patterns 66a, 66b and 66c fills openings of the first black matrix 63a and corresponds to each pixel region P. A common electrode 70 is disposed on the color filter pattern 66.

A spacer 56 is disposed between the first and second substrates 11 and 61 to maintain a cell gap.

A seal pattern 85 is disposed along the second black matrix 63b to surround a display region AA. The seal pattern 85 prevents leakage of the liquid crystal and attaches the first and second substrates 11 and 61.

A gate pad region GPA and a data pad region DPA are disposed at a non-display region that is outside the seal pattern 85 of the first substrate 11. In the gate and data pad regions GPA and DPA, gate and data pads are formed, respectively. The gate pad includes a gate pad electrode 12 and a gate pad electrode terminal 52. The data pad includes a data pad electrode (not shown) and a data pad electrode terminal 54. The data pad electrode may be made of the same material as the data line 30 in a process of forming the data line 30, and the data pad electrode terminal 54 is made of the same material as the pixel electrode 50 in a process of forming the pixel electrode 50.

The gate and data pads are connected to a PCB (printed circuit board) having driving circuits through a TCP (tape carrier package) film. A gate driver GD or a data driver is disposed on the TCP film.

A connection part 80 of an end portion of the TCP film contacts the gate or data pads i.e., the gate pad electrode terminal 52 or the data pad electrode terminal 54. A protecting film 87 covers the connection part 80. The protecting film 87 functions to prevent detachment of the TCP film and the gate and data pads.

In the related art LCD device, the seal pattern, the protecting film and the spacer are made of a heat-cured or UV-cured organic material including epoxy or acrylic. However, when such material is used, there are some problems. For example, when the seal pattern 85 is made of such material, breakdown of the seal pattern increases due to heating, and thus the drawbacks increase. In addition, epoxy and acrylic are expensive. Therefore, productivity decreases and product cost increases.

SUMMARY OF THE INVENTION

Accordingly, the present invention is directed to a liquid crystal display device and fabrication method thereof that substantially obviates one or more of the problems due to limitations and disadvantages of the related art.

An advantage of the present invention is to provide an LCD device made using frit glass or glass paste.

Additional features and advantages of the invention will be set forth in the description which follows, and in part will be apparent from the description, or may be learned by practice of the invention. The objectives and other advantages of the invention will be realized and attained by the structure and method particularly pointed out in the written description and claims hereof as well as the appended drawings.

To achieve these and other advantages and in accordance with the purpose of the present invention, as embodied and broadly described, a liquid crystal display device includes first and second substrates facing each other; a liquid crystal layer between the first and second substrates; and a seal pattern between the first and second substrates surrounding the liquid crystal layer, wherein the seal pattern is made of one of frit glass and glass paste.

In another aspect of the present invention, a liquid crystal display device includes first and second substrates facing each other; a liquid crystal layer between the first and second substrates having a cell gap; and a spacer between the first and second substrates maintaining the cell gap, wherein the spacer is made of one of flit glass and glass paste.

In another aspect of the present invention, a liquid crystal display device includes gate and data pads at a peripheral region of a substrate supplied with signals from a driving circuit; a connection part contacting one of the gate and data pads to connect the gate and data pads and the driving circuit; and a protection film covering a contact region of the connection part and the one of the gate and data pads, wherein the protection film is made of one of frit glass and glass paste.

In another aspect of the present invention, a method of fabricating a liquid crystal display device includes coating one of frit glass and glass paste along a peripheral region of a first substrate using one of a syringe and a dispenser, thereby forming a seal pattern; attaching the first substrate and a second substrate with the seal pattern and curing the seal pattern; and injecting liquid crystal between the first and second substrates surrounded by the seal pattern.

In another aspect of the present invention, a method of fabricating a liquid crystal display device includes forming a black matrix on a display region of a first substrate; coating one of frit glass and glass paste on one of the first substrate and a second substrate using one of a syringe and a dispenser to correspond to the black matrix, thereby forming a spacer; curing the spacer; and attaching the first and second substrates and injecting liquid crystal between the first and second substrates.

In another aspect of the present invention, a method of fabricating a liquid crystal display device includes forming gate and data pads at a peripheral region of a substrate; contacting a connection part to one of the gate and data pads to connect the gate and data pads and a driving circuit; and coating one of frit glass and glass paste, thereby forming a protection film covering a contact region of the connection part and the one of the gate and data pads.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Figure 1:
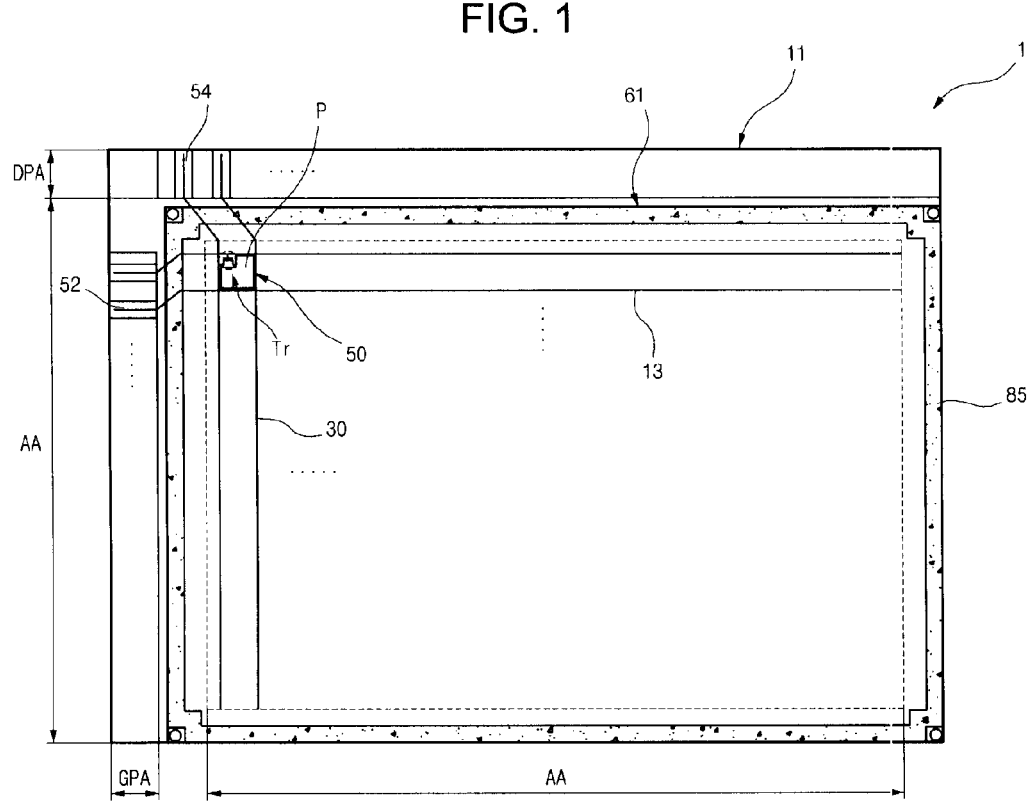
FIG. 1 is a schematic plan view of an LCD device according to the related art.
Figure 2:
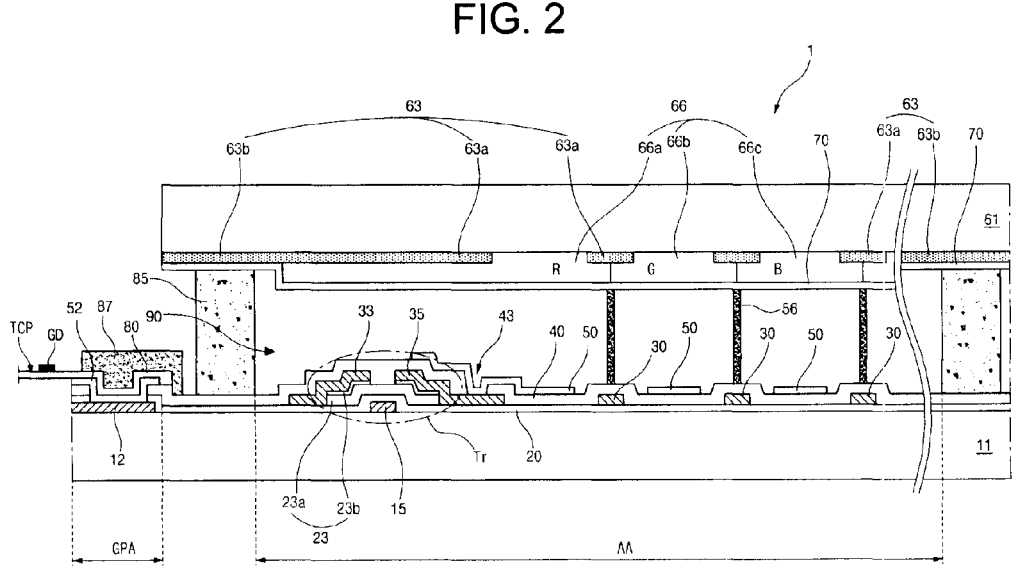
FIG. 2 is a cross-sectional view of an LCD device of FIG. 1.

Reference will now be made in detail to exemplary embodiments of the present invention, examples of which are illustrated in the accompanying drawings. The LCD device according to exemplary embodiments of the present invention may have a structure similar to that of the LCD device of FIGS. 1 and 2. Accordingly, detailed explanations of parts of the present invention similar to parts of the LCD device of FIGS. 1 and 2 will be omitted.

A seal pattern, a protection film and a spacer according to exemplary embodiments of the present invention may include frit glass or glass paste.

The frit glass may include a chief ingredient of lead oxide (PbO), and an accessory ingredient including zinc oxide (ZnO), silicon oxide ($SiO_2$), a barium oxide (BaO) powder, a filler and/or a binding material. The frit glass is mixed into an organic solvent and heated at about 300 degrees to about 500 degrees centigrade to be baked. Accordingly, the flit glass may be used for the seal pattern, the protection film, the spacer, etc. The frit glass has a paste state like a glass power when it is mixed into the organic solvent.

The glass paste may include lead oxide (PbO), zinc oxide (ZnO), silicon oxide ($SiO_2$), a barium oxide (BaO) powder and/or a binding material. The glass paste is heated at about 400 degrees to about 900 degrees centigrade to be baked. Accordingly, the glass paste can be used for the seal pattern, the protection film, the spacer, etc. The glass paste has properties, such as a maximum coefficient of thermal expansion of about $100 \times 10^{-7}/°$ C., an insulation resistance of about $10^{12} \Omega$, a density of about 2 $g/cm^3$ to about 6 $g/cm^3$, and a maximum bending strength of 40 MPa.

Because the frit glass and the glass paste are materials similar to glass, they are excellent in sealing or attaching a substrate made of a glass. In particular, because a substrate for an LCD device is made of a glass, when the frit glass or the glass paste is used for fabricating the LCD device, there is no reaction therebetween. In addition, when the frit glass or the glass paste contact liquid crystal, there is no phenomenon such as the generation of impurities. Therefore, the frit glass or the glass paste has great advantages for fabricating the LCD device.

The frit glass in a paste state or the glass paste may be coated on a substrate using a syringe or dispenser. The coated frit glass or glass paste is baked to form the seal pattern, the protection film, the spacer, etc.

Figure 3:
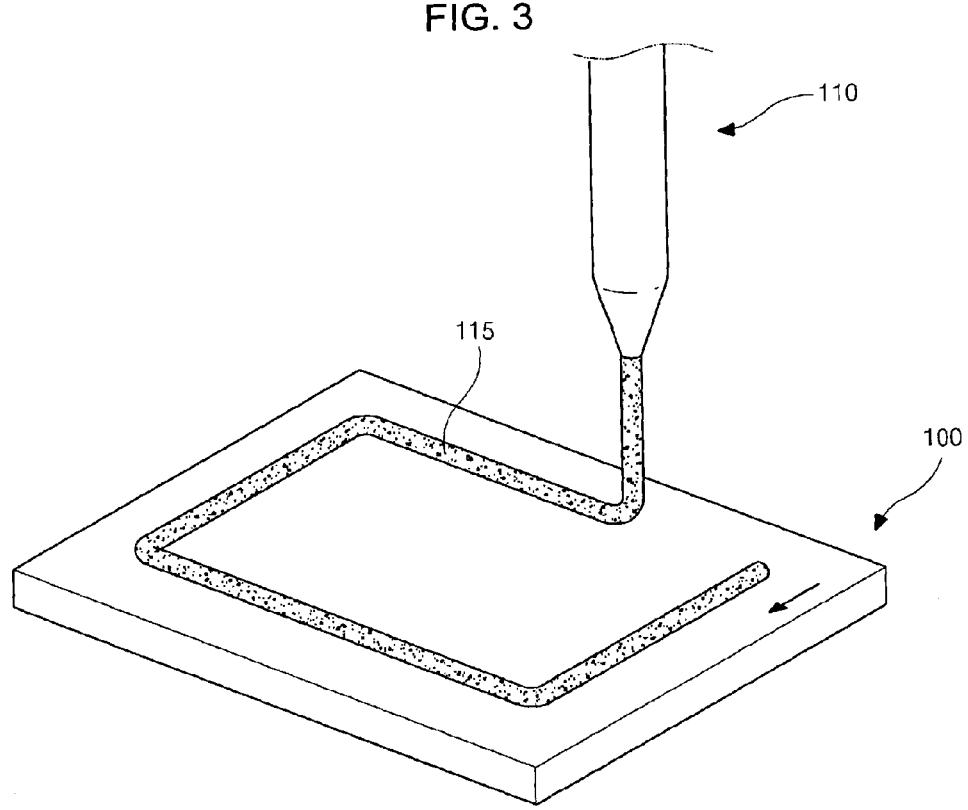
FIG. 3 is a schematic perspective view illustrating a process of forming a seal pattern on a substrate for an LCD device using a frit glass or glass paste according to an exemplary embodiment of the present invention.

FIG. 3 is a schematic perspective view illustrating a process of forming a seal pattern on a substrate for an LCD device using a frit glass or glass paste according to an exemplary embodiment of the present invention. In FIG. 3, a substrate 100 may be one of the first and second substrates for the LCD device.

A seal pattern 115 attaches two substrates for the LCD device and maintains a cell gap at a peripheral region of the two substrates. The seal pattern 115 contacts liquid crystal, filling an active region (AA of FIGS. 1 and 2) of the LCD device. Because the seal pattern 115 is made of frit glass or glass paste, the seal pattern 115 does not react with the liquid crystal. In addition, the seal pattern 115 has an excellent adhesion to the substrate 100 so that the seal pattern 115 fixes the two substrates for the LCD device firmly. In particular, the frit glass and the glass paste are cheaper than the related art epoxy and acrylic, and thus product cost can be reduced. Therefore, the seal pattern 115 made of the frit glass or glass paste can seal the LCD device stably with low cost.

Further, because the seal pattern 115 is made of a glass material similar to the substrate 100, the seal pattern 115 becomes hard by curing. Accordingly, breakdown of the seal pattern 115 due to heating does not occur.

Hereinafter, a method of forming the seal pattern 115 is explained. In FIG. 3, a syringe 110 is used to form the seal pattern 115. However, other devices may be used to form the seal pattern 115. For example, a dispenser may be used.

As shown in FIG. 3, the frit glass or glass paste is filled in the syringe 110. Then, the syringe 110 may move along a peripheral region of the substrate 100 and continuously dispenses the frit glass or glass paste to form the seal pattern 115. The substrate 100 may be a first substrate, where a thin film transistor and a pixel electrode are formed, or a second substrate, where a color filter pattern and a common electrode are formed. Then, the substrate 100 having the seal pattern 115 and an opposing substrate are attached with the seal pattern 115. Then, liquid crystal is injected between the substrate 100 and the opposing substrate. The seal pattern 115 has an injection opening to inject the liquid crystal. When injection of the liquid crystal is completed, the injection opening is closed. Then, the seal pattern 115 is cured, and thus the LCD device is completed. A temperature of curing the seal pattern 115 may be about 300 degrees to about 500 degrees centigrade when using the frit glass, and about 400 degrees to about 900 degrees centigrade when using the glass paste.

Figure 4:
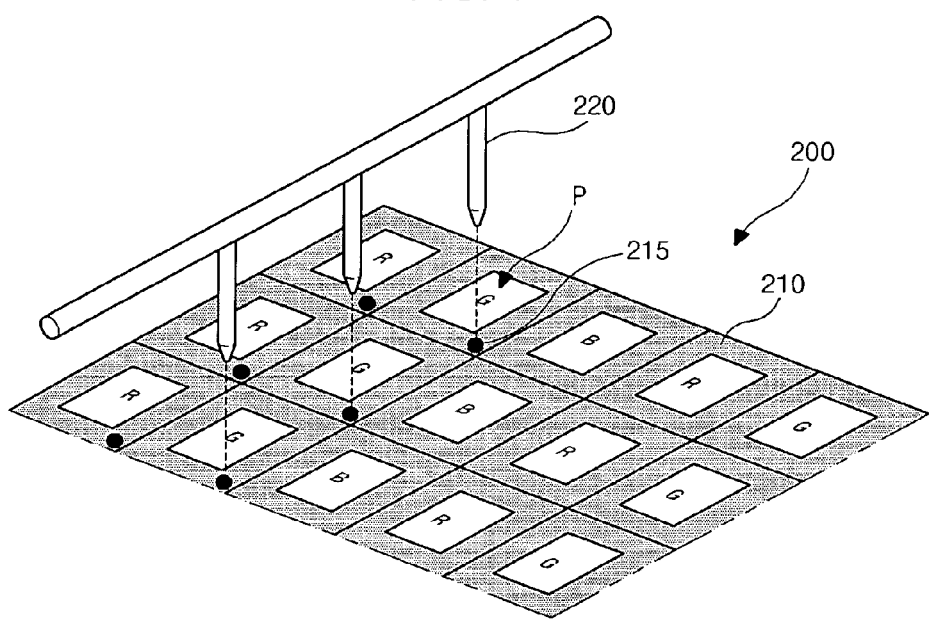
FIG. 4 is a schematic perspective view illustrating a process of forming a spacer on a substrate for an LCD device using a frit glass or glass paste according to another exemplary embodiment of the present invention.

FIG. 4 is a schematic perspective view illustrating a process of forming a spacer on a substrate for an LCD device using a frit glass or glass paste according to another exemplary embodiment of the present invention.

The spacer 215 functions to maintain a cell gap between two substrates for the LCD device. The spacer 215 of FIG. 4 may be referred to as a patterned spacer. The spacer 215 may also be made of the same material as the seal pattern of FIG. 3. The spacer 215 may be made of the frit glass or glass paste. In addition, the spacer 215 is also formed with the same device as the seal pattern of FIG. 3.

In FIG. 4, a syringe 220 is used to form the spacer 215. However, other devices may be used to form the spacer 215, for example, a dispenser may be used. In FIG. 4, a substrate 200 is a second substrate having a color filter pattern, however, a first substrate having a thin film transistor may be used.

As shown in FIG. 4, a plurality of syringes 220 is arranged in a first direction by a regular distance. The syringe 220 may dispense the frit glass or glass paste of several micrometers from an end of the syringe 220 to the substrate 200. The syringes 220 move along a second direction perpendicular to the first direction to dispense the frit glass or glass paste. The syringe 220 need not continuously dispense but can dispense the frit glass or glass paste at predetermined intervals, differently from the dispensing of the syringe of FIG. 3. Accordingly, the dispensed frit glass or glass paste may form the spacers 215 to be spaced apart from each other on the substrate 200. Also, the dispensed frit glass or glass paste may form the spacers 215 to have a dot shape.

The spacer 215 may be formed on a black matrix 210 surrounding each pixel region P. The spacer 215 is baked during about 5 minutes to about 30 minutes, at about 300 degrees to about 500 degrees centigrade when using the frit glass or about 400 degrees to about 900 degrees centigrade when using the glass paste, thereby forming the cured spacer 215. The spacers 215 may be spaced apart at a constant interval, for example, by one pixel region or several pixel regions.

As explained above, because the spacer 215 may be formed using the syringe 220 or a dispenser, the spacer 215 can be formed adequately in accordance with various types of LCD devices having different cell gaps. In other words, an amount of the frit glass or glass paste dispensed through the syringe or dispenser may be adjusted so that a height of the spacer 215 can be adjusted. Accordingly, the spacer 215 can easily have the height required for the different cell gaps of the various types of LCD devices.

Further, the spacer 215 can maintain the cell gap firmly because the frit glass and glass paste resist pressure thereon and thermal deformation. In the related art spacer made of an organic material that has a low hardness, when pressure is applied thereon, the spacer collapses and thus the cell gap is not maintained. However, because the spacer 215 of the exemplary embodiment of the present invention is made of the frit glass or glass paste similar to a glass having a high hardness and although the pressure is put on the spacer 215, the spacer 215 does not collapse and the cell gap can be maintained effectively. Therefore, degradation of display quality due to pressure and thermal deformation can be prevented.

When the spacer 215 is formed on the first substrate having a thin film transistor and gate and data lines instead of the second substrate 200 of FIG. 4, the spacer 215 may be formed on the thin film transistor and the gate and data lines. When attaching the two substrates for the LCD device, the black matrix 210 may be disposed on the thin film transistor and the gate and data lines. Accordingly, the spacer formed on the first substrate is also disposed corresponding to the black matrix 210 like the spacer formed on the second substrate as shown in FIG. 4. Also, the spacer 215 formed on one of the first and second substrates may contact a common electrode or an overcoat layer of the second substrate 200 according to a type of the LCD device, and a passivation layer of the first substrate.

As explained above, the frit glass or glass paste is used for the seal pattern and the spacer. Further, although not shown, the frit glass or glass pasted may be used for a protecting film covering a contact region of a connection part of a TCP film and gate and data pads. In addition, in a COG (chip on glass) type LCD device, in which an integrated chip for a gate driver or a data driver is directly on the substrate not using a TCP film, a protecting film made of the frit glass or glass paste may cover the integrated chip. Because the frit glass or glass paste has a good adhesion and a high hardness, the protecting film can function as a reliable covering agent.

As described above, because the seal pattern is made of the frit glass or glass paste, breakdown of the seal pattern can be prevented. Further, because the spacer is made of the frit glass or glass paste, collapse due to pressure and thermal deformation can be prevented and the cell gap can be maintained effectively. Also, a height of the spacer can be easily adjusted in accordance with the different cell gaps required for the various types of LCD devices. Further, because the protection film is made of the frit glass or glass paste, a contact region of the gate and data pads and the driving circuit can be stably protected.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates;
   a seal pattern disposed between the first and second substrates and surrounding a display area;
   gate and data pads disposed on the first substrate in a non-display area outside the seal pattern, wherein the gate pad includes a gate pad electrode and a gate pad electrode terminal, and the data pad includes a data pad electrode and a data pad electrode terminal;
   a connection part at an end of a TCP film including a driving circuit thereon, the connection part directly on and contacting one of the gate pad electrode terminal and the data pad electrode terminal of the gate and data pads to connect the one of the gate and data pads and the driving circuit; and a protection film directly on the connection part and covering a contact region of the connection part and the one of the gate and data pads in the non-display region outside the seal pattern, wherein the protection film is made of one of frit glass and glass paste, wherein the connection part is between the one of the gate pad electrode terminal and the data pad electrode terminal of the gate and data pads and the protection film, and the connection part has a same shape as the gate and data pad electrode terminals in the contact region, wherein the protection film has an adhesion such that detachment of the TCP film and the one of the gate and data pads on the first substrate is prevented and has a hardness such that the contact region in the non-display region outside the seal pattern is protected, and wherein the protection film is spaced apart from the seal pattern.

2. The device according to claim 1, wherein the frit glass includes lead oxide (PbO), zinc oxide (ZnO), silicon oxide ($SiO_2$), a barium oxide (BaO) powder, a filler and a binding material.

3. The device according to claim 1, wherein the glass paste includes lead oxide (PbO), zinc oxide (ZnO), silicon oxide ($SiO_2$), a barium oxide (BaO) powder and a binding material.

* * * * *